(12) United States Patent
Melodia

(10) Patent No.: US 7,928,618 B2
(45) Date of Patent: Apr. 19, 2011

(54) ELECTROMAGNETIC ENGINE

(75) Inventor: Robert S. Melodia, Rio Rancho, NM (US)

(73) Assignee: Robert S. Melodia, Rio Ranho, NM (US)

( * ) Notice: Subject to any disclaimer, the term of this patent is extended or adjusted under 35 U.S.C. 154(b) by 609 days.

(21) Appl. No.: 11/758,929

(22) Filed: Jun. 6, 2007

(65) Prior Publication Data

US 2007/0279164 A1 Dec. 6, 2007

Related U.S. Application Data

(60) Provisional application No. 60/803,984, filed on Jun. 6, 2006.

(51) Int. Cl.
*H02K 39/08* (2006.01)

(52) U.S. Cl. .............................. 310/71; 310/233; 310/237

(58) Field of Classification Search ................... 310/237, 310/233, 71, 246

See application file for complete search history.

(56) References Cited

U.S. PATENT DOCUMENTS 5,744,889 A * 4/1998 Niimi ............................. 310/239
6,218,761 B1 * 4/2001 Richter et al. ................. 310/264

* cited by examiner

*Primary Examiner* — Quyen Leung
*Assistant Examiner* — Leda Pham

(57) ABSTRACT

A contact system for energizing an electromagnetic engine includes a fixed first contact set connected to an electrical power source and having an axial face and a first electrical connector disposed on at least a portion of the axial face. The contact system includes a rotatable second contact set having an axial face adjacent the axial face of the first contact set and a plurality of spaced apart second electrical connectors extending along the axial face. The second electrical connectors are connected to a set of electromagnetic coils and energize a predetermined number of the electromagnetic coils when the second electrical connectors engage with the first electrical connector during rotation of the second contact set. The present invention also provides an electromagnetic engine having a housing, a first contact set, a controller, and stator ring and rotor assemblies that produce an electromotive force to spin a shaft of the engine.

26 Claims, 15 Drawing Sheets

ELECTROMAGNETIC ENGINE

CROSS-REFERENCE TO RELATED APPLICATIONS

This application claims priority to and the benefit of the filing of U.S. Provisional Patent Application Ser. No. 60/803,984, entitled "Electromagnetic Engine", filed on Jun. 6, 2006, and the specification thereof is incorporated herein by reference.

BACKGROUND OF THE INVENTION

The present invention relates in general to engines and electric motors.

BRIEF SUMMARY OF THE INVENTION

A contact system for energizing an electromagnetic engine of the present invention includes a fixed first electrical contact set having an axial face and at least a first electrical connector disposed on at least a portion of the axial face. The first electrical contact set is connected to a variable or fixed power source. The contact system includes a rotatable second contact set having an axial face adjacent the axial face of the first contact connector and a plurality of spaced apart second electrical connectors extending along the axial face. Each of the second electrical connectors are connected to a set of electromagnetic coils and the second electrical connectors energize a predetermined number of the electromagnetic coils when the second electrical connectors engage with the first electrical connector during rotation of the second electrical contact set.

Alternatively, the first electrical connector comprises a canted coil. Alternatively, the second electrical connectors comprise a plurality of contacts placed on a side of a canted coil. Alternatively, the first contact set is adapted to be mounted within a cylinder airspace within an electromagnetic engine housing. Alternatively, the second contact set is adapted to be mounted on a rotor that surrounds a rotatable shaft. The second electrical connectors may be connected to a predetermined number of electromagnetic coils to induce movement of the shaft.

Alternatively, the first electrical connector extends along a predetermined annular distance of the axial face of the first contact set. The predetermined annular distance may be sized to allow a predetermined number of the second electrical connectors to engage with the first electrical connector. Alternatively, the second electrical connectors are equally annularly spaced apart on the axial face of the second contact set.

In another embodiment, the present invention provides an electromagnetic engine that includes at least one housing defining an airspace therein, a first contact set disposed within and attached to at least one housing and connected to a variable or fixed power source, and a controller connected to the electrical power source, a stator outer ring assembly disposed within and attached to the at least one housing and connected to the controller. The controller is operable to intermittently energize at least a portion of the stator outer ring assembly. The electromagnetic engine includes a rotor assembly disposed within and rotatably engaged within the at least one housing. The rotor assembly includes a shaft and a second contact set and disposed radially inwardly from the stator outer ring assembly. The second contact set includes a plurality of electrical connectors. The electrical connectors intermittently engage with the first contact set to energize the rotor assembly, the rotor assembly and the stator outer ring assembly producing an electromotive force to create movement of the shaft during operation of the electromagnetic engine.

Alternatively, the rotor assembly and the stator outer ring assembly produce the electromotive force by repulsion. The rotor assembly and the stator outer ring assembly may produce the electromotive force by attraction and repulsion. Alternatively, the engine further comprises a plurality of housings and/or electromagnetic engines mounted together and the shaft placed within said housings. Alternatively, the first contact set comprises at least one canted coil disposed on an axial face of a housing. The canted coil, which is placed within a predetermined area, may extend for a predetermined annular distance along the first contact connector housing. Alternatively, the second contact set further comprises a plurality of annularly spaced button contacts that are placed in a predetermined order on a side of the canted coil. The button contacts may be equally annularly spaced apart on the second contact set.

Alternatively, the stator ring assembly comprises a plurality of radially inwardly extending posts having electric wire wound thereon and forming stator windings, the stator windings connected to a variable or fixed power source, and the rotor assembly comprises a plurality of radially outwardly extending posts having electric wire wound thereon and forming rotor windings, the rotor windings connected to the second contact set. The stator windings may create an electromagnet of a predetermined polarity when energized and the electrical connectors may be connected to a predetermined number of rotor windings and may create an electromagnet of a predetermined polarity opposite the polarity of the stator windings when energized.

Alternatively, the engine further comprises a switching mechanism connected to the controller. Alternatively, the controller is selected from a group consisting of software, hardware, or combinations thereof. Alternatively, the stator outer ring assembly is attached to the housing by a plurality of bushings and fasteners. The bushings may comprise a nonmagnetic material.

Alternatively, the engine further comprises a plurality of cooling passages formed in the housing to allow air flow through the airspace of the housing. Alternatively, the engine further comprises a demagnetization system for demagnetizing magnetic energy present in at least the housing, the stator assembly, the rotor assembly, the windings and the shaft. Alternatively, the demagnetization system may reabsorb magnetic energy from the housing, the stator, the rotor assembly, the windings, the shaft or other parts of the engine to be used by the system for energy. Alternatively, the engine further comprises a plurality of stator outer ring assemblies and rotor assemblies spaced along a length of the shaft, each of the stator outer ring assemblies and rotor assemblies disposed in at least another housing.

Objects, advantages and novel features, and further scope of applicability of the present invention will be set forth in part in the detailed description to follow, taken in conjunction with the accompanying drawings, and in part will become apparent to those skilled in the art upon examination of the following, or may be learned by practice of the invention. The objects and advantages of the invention may be realized and attained by means of the instrumentalities and combinations particularly pointed out in the appended claims.

BRIEF DESCRIPTION OF THE SEVERAL VIEWS OF THE DRAWINGS

The accompanying drawings, which are incorporated into and form a part of the specification, illustrate one or more embodiments of the present invention and, together with the description, serve to explain the principles of the invention. The drawings are only for the purpose of illustrating one or more preferred embodiments of the invention and are not to be construed as limiting the invention. In the drawings:

FIGS. 1, 1A and 1B are end and side views, respectively, of an embodiment of an electromagnetic engine of the present invention;

DETAILED DESCRIPTION OF THE INVENTION

Figure 1:
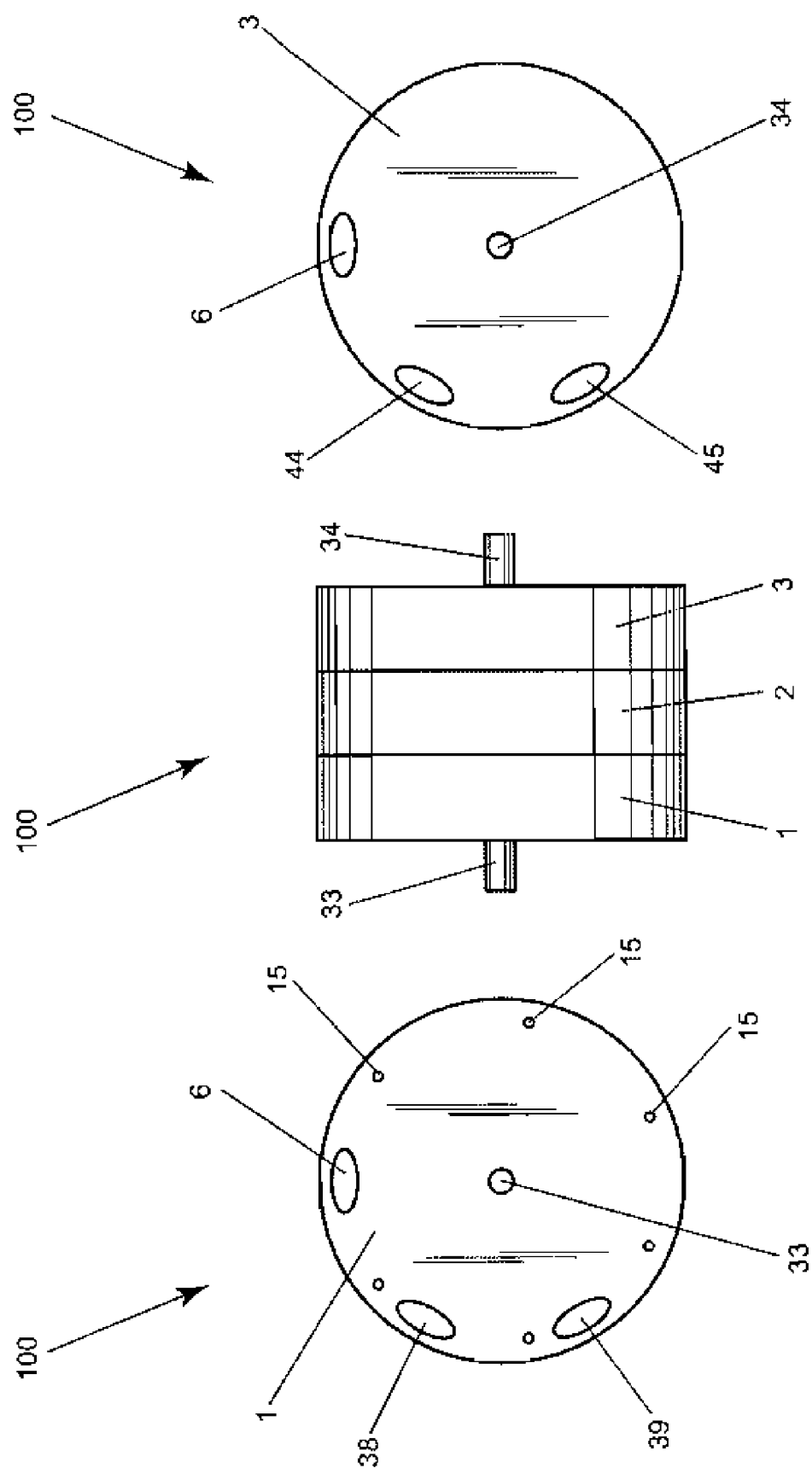
Figure 2:
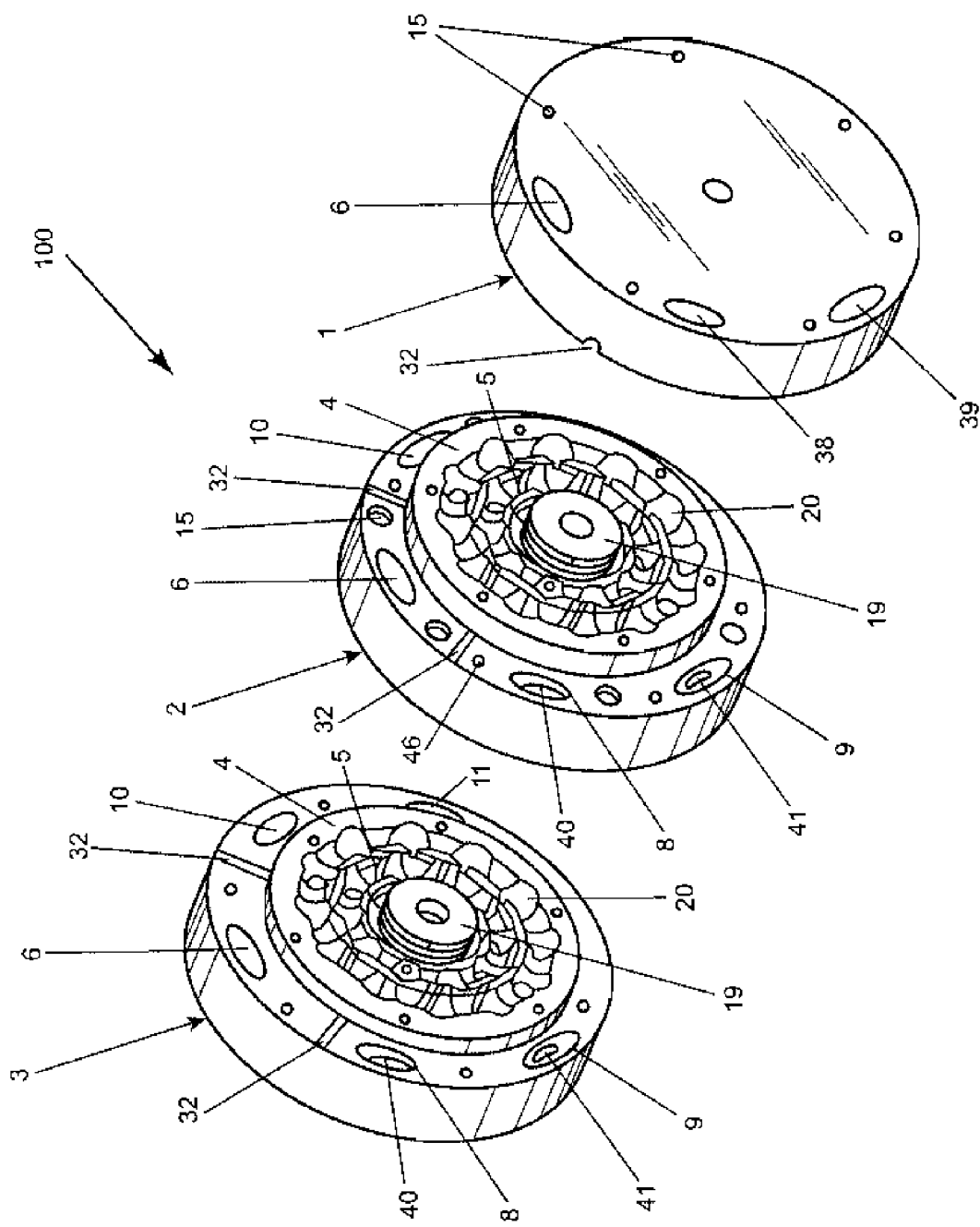
FIG. 2 is an exploded perspective view of the electromagnetic engine of FIG. 2.
Figure 3:
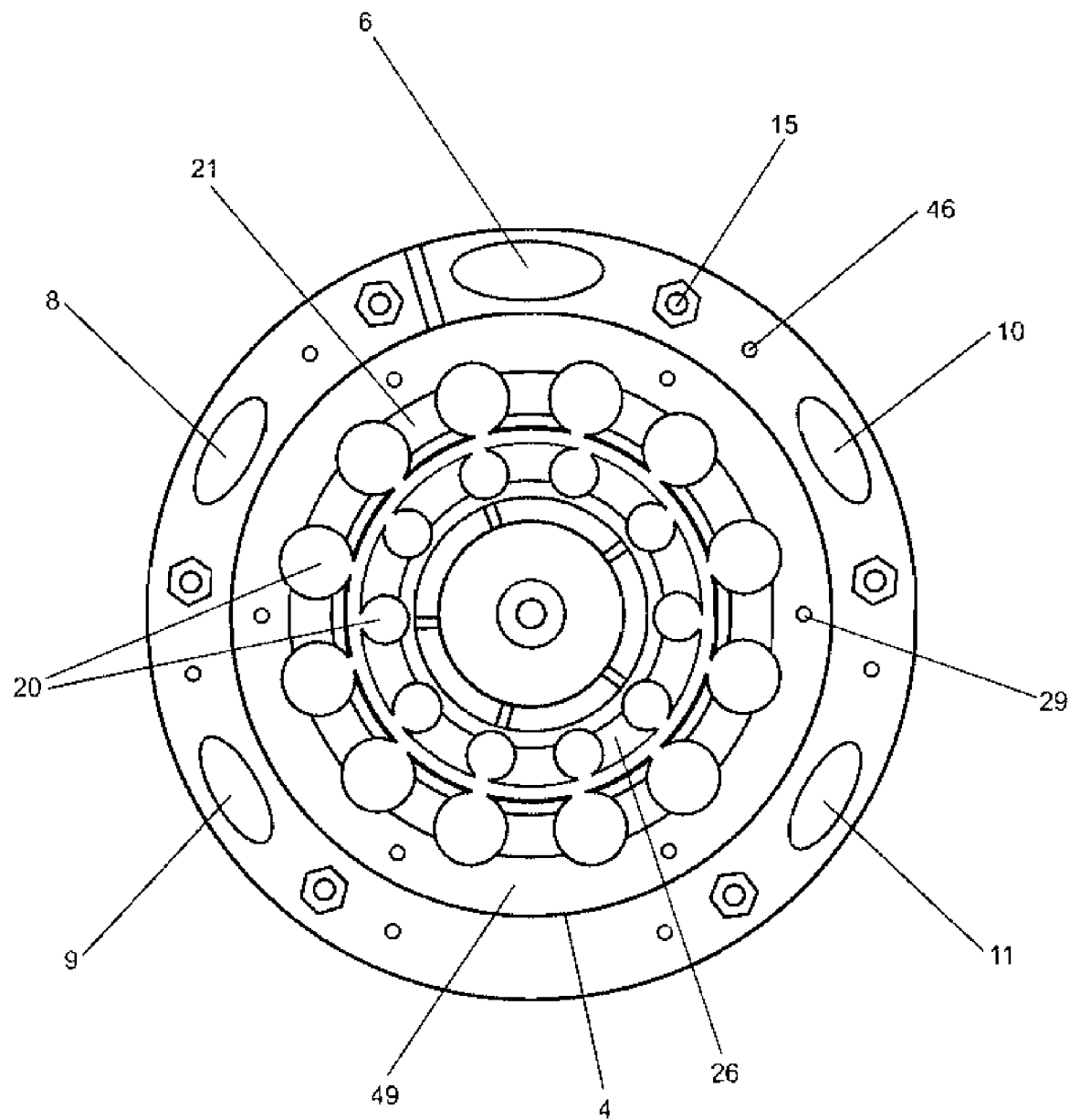
FIG. 3 is an end view of a partially assembled electromagnetic engine of FIG. 2.
Figure 3A:
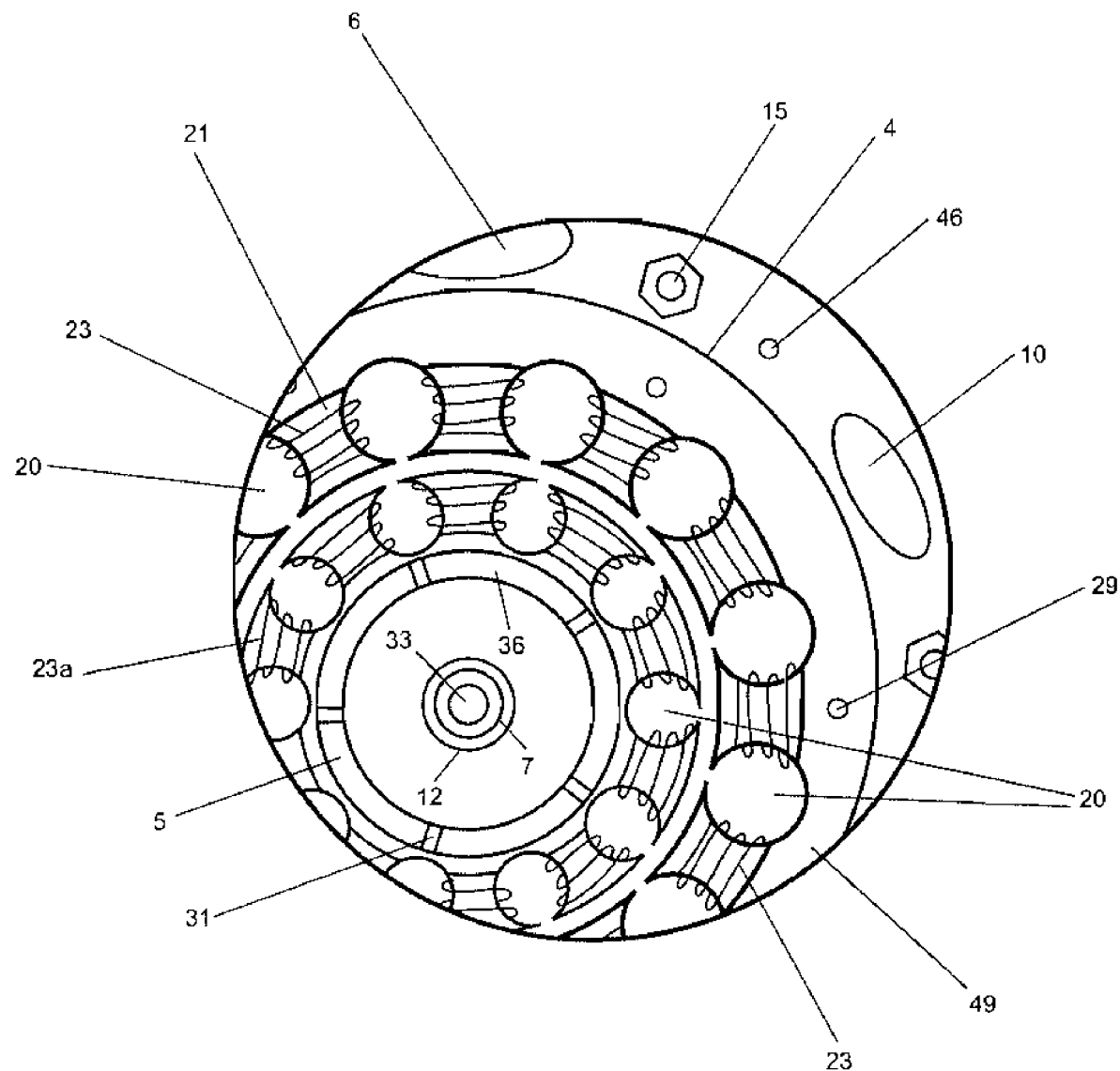
FIGS. 3A, 3B and 3C are end views on enlarged scales showing the ring posts, rotor posts, and wings of the electromagnetic engine of the present invention.
Figure 3B:
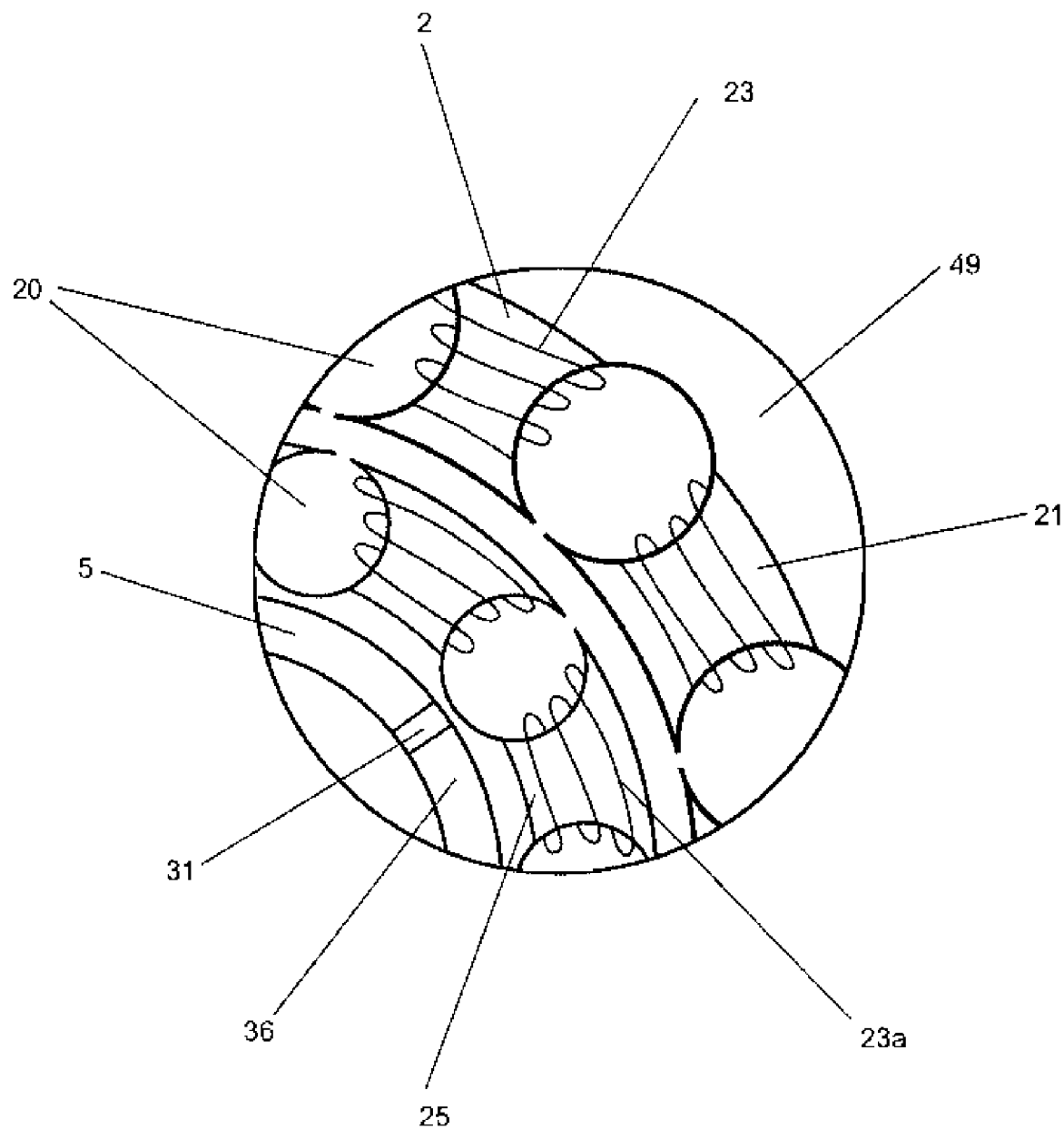
Figure 3C:
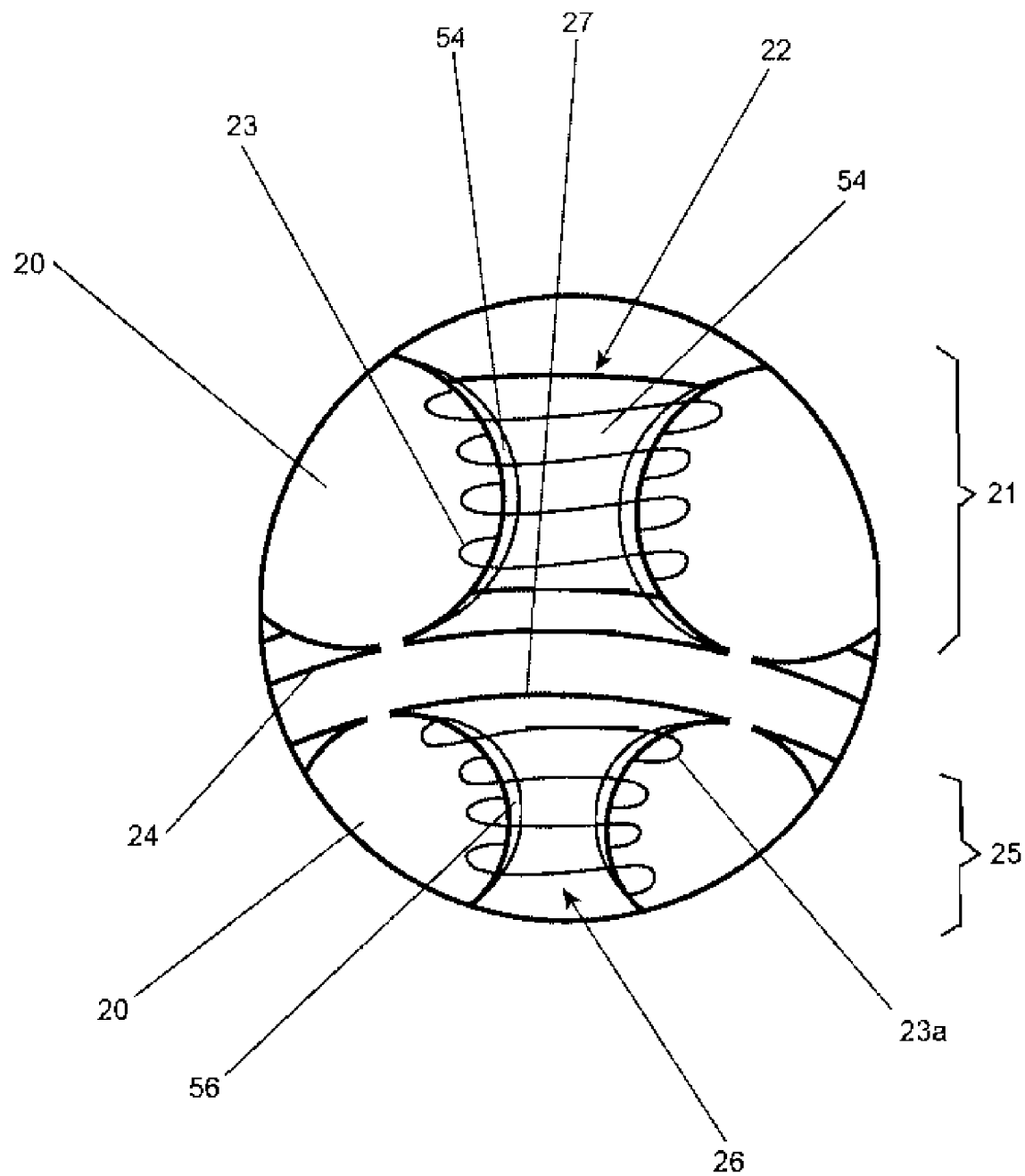

FIGS. 1-11 illustrate an electromagnetic engine according to an embodiment of the present invention, indicated generally at 100. The engine 100 has outer housings 1 and 3 and at least one intermediate housing 2 preferably formed from aluminum, magnesium, plastic, a combination thereof, or any other suitable material. Crankshaft or shaft 7 extends along the center axis of the electromagnetic engine 1. Shaft 7 is preferably circular in cross section and includes a plurality of keys 12 formed thereon. Roller bearings 13 are mounted along the crankshaft 7 within the engine cylinder housing 2 and thrust bearings (not shown) are preferably mounted at the opposite ends of the engine housing 1, 3. End 34 of the crankshaft 7 preferably has a smaller diameter to mount a thrust bearing thereon and extends from the engine housing 3 to connect to a load 68 (best seen in FIG. 9), such as transfer mechanism or an assistive device (not shown) to help cause movement, work or lift. End 33 of crankshaft 7 opposite end 34 preferably has a smaller diameter to mount an opposite thrust bearing and may extend through the engine housing 2 to connect to load 68, such as a fan, bell housing, or other device, to run an air-conditioning compressor, a generator, an air pump or similar devices or any device to help cause movement, work or lift, as will be appreciated by those skilled in the art.

Figure 4:
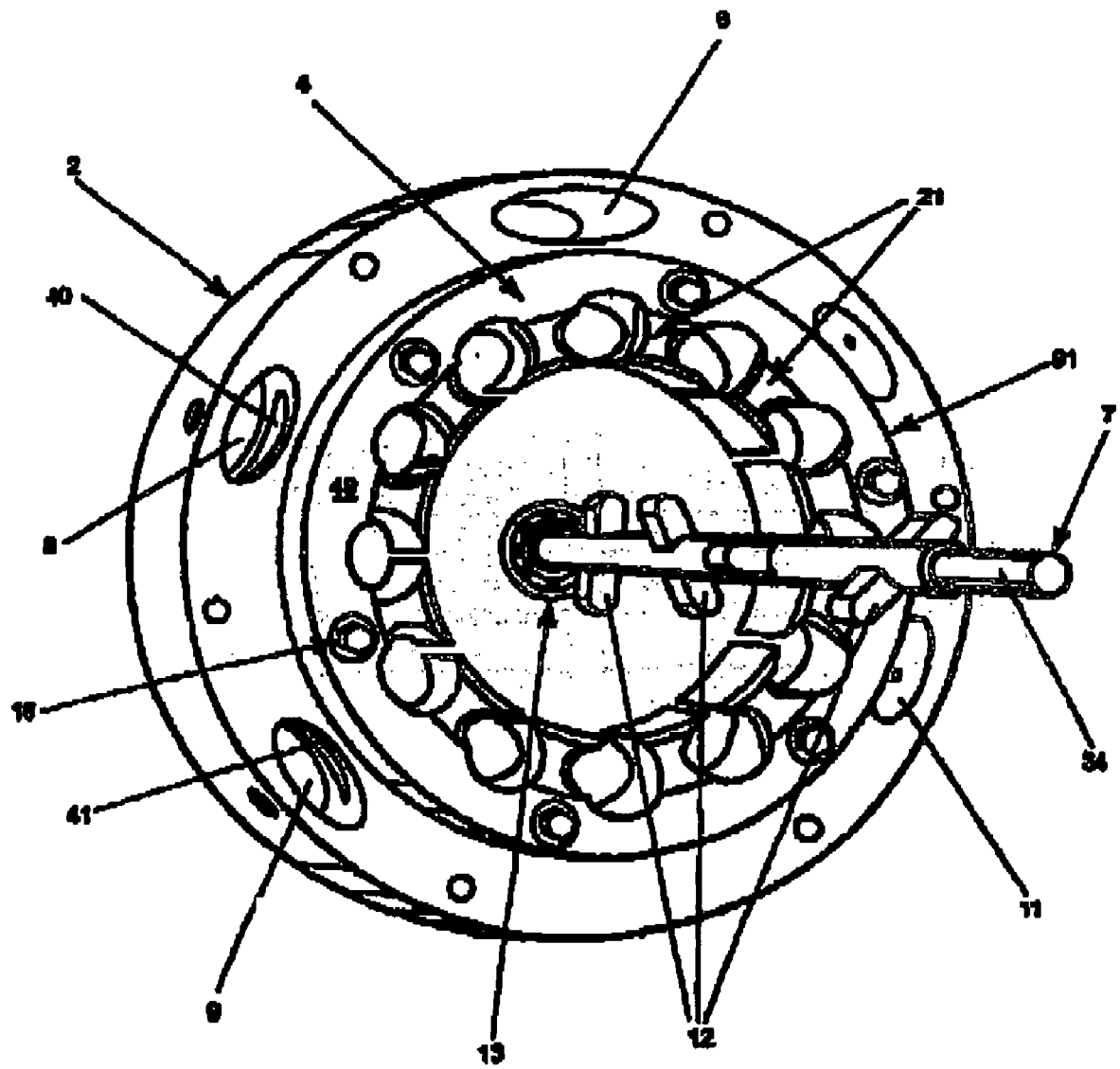
FIG. 4 is a perspective view of a partially assembled electromagnetic engine of FIG. 2.
Figure 5:
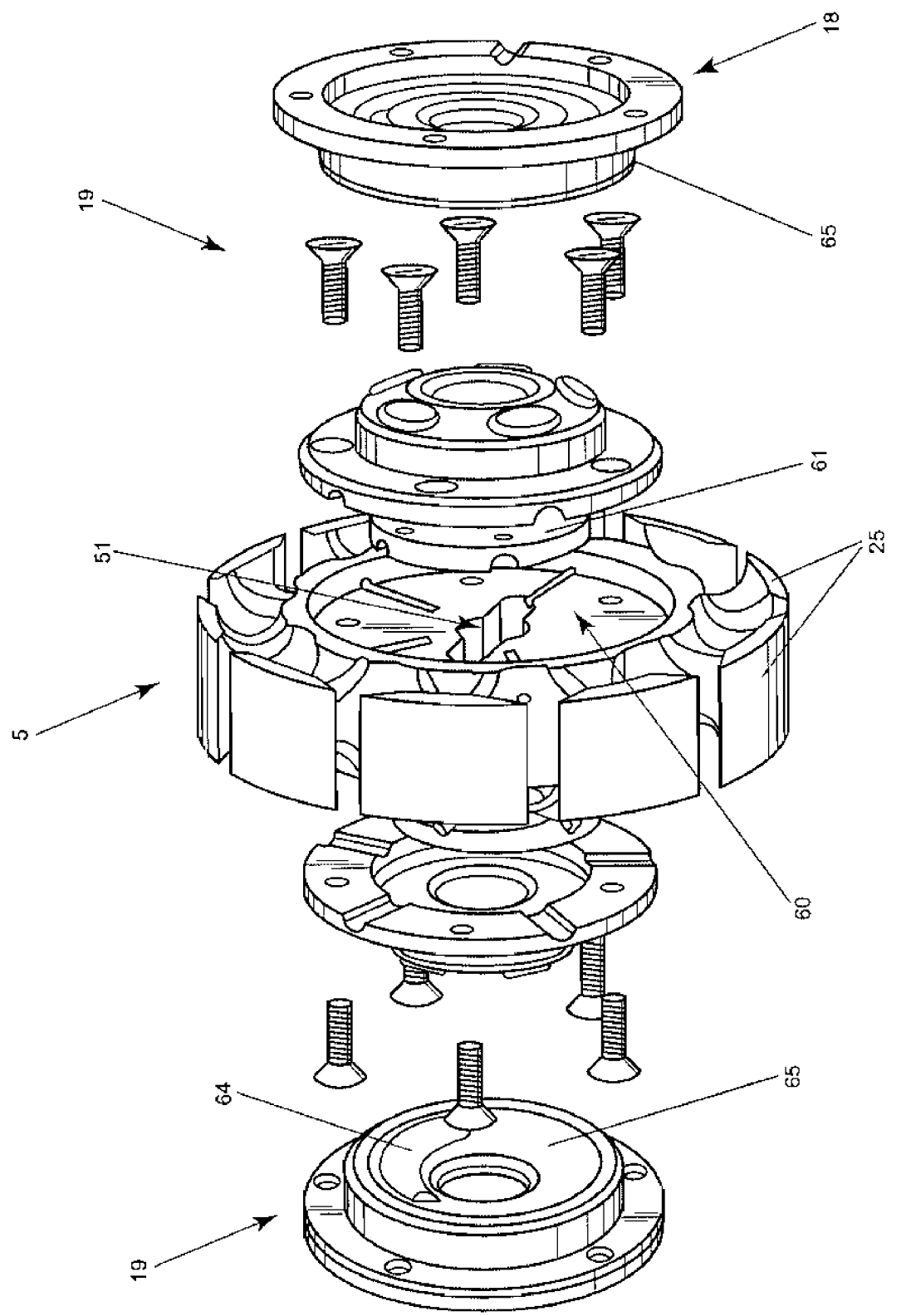
FIG. 5 is an exploded perspective view of contact sets and rotor of the electromagnetic engine of the present invention.
Figure 6A:
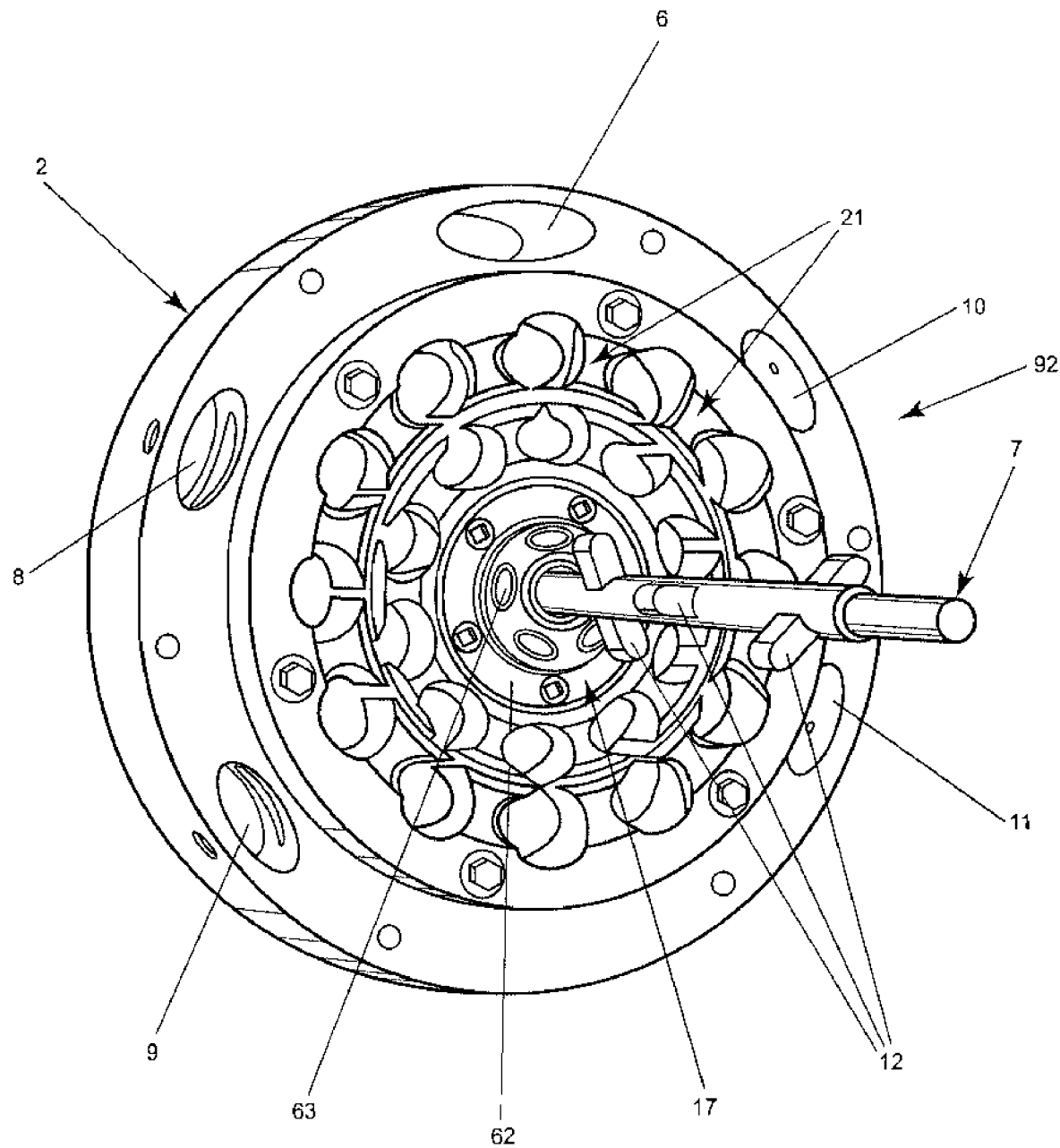
FIGS. 6A and 6B are perspective views, respectively, of a partially assembled electromagnetic engine of FIG. 2.
Figure 6B:
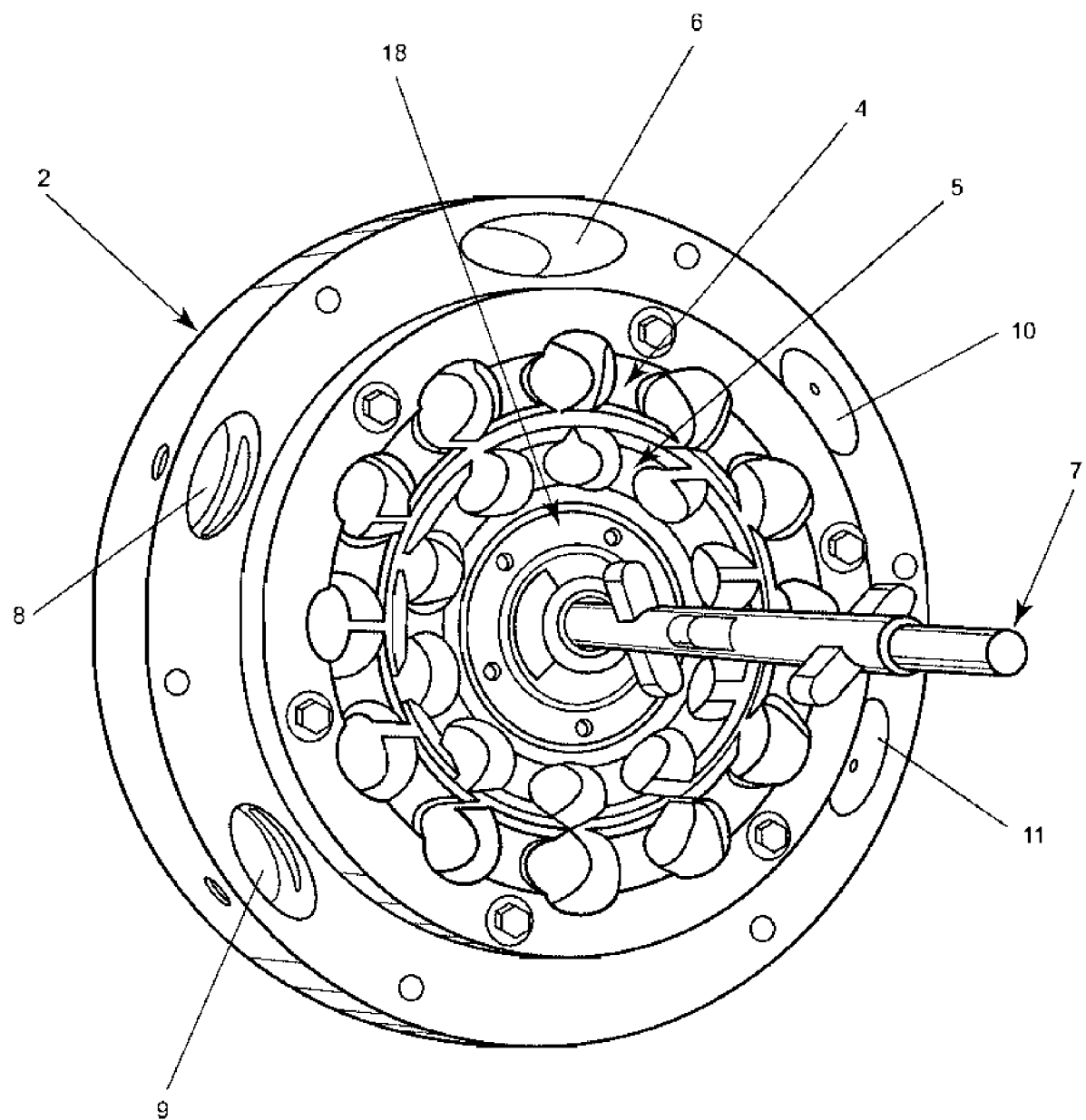

The outer electromagnetic ring 4 is preferably formed from a magnetic and/or electrically conductive material and is connected to the engine housings 1, 2, or 3 with a plurality of bushings 16, best seen in FIG. 4. Bushings 16 are preferably formed from a non-magnetic material and in a preferably circular shape to cooperate with a corresponding plurality of annularly spaced openings 29 formed in face 49 of outer electromagnetic ring 4. A plurality of bolts and washers or similar fasteners each preferably formed from non-magnetic material extend through each opening 29 and into a corresponding plurality of holes 48 formed in engine cylinder housing wall face 35 such as by a threaded connection or the like.

Outside electromagnetic ring 4 is fixed in relationship with respect to engine housings 1, 2 and 3. Cylinder airspace 20 is defined as the distance between face 49 of the outer electromagnetic ring 4 and engine housing wall face 35. Bushings 16, with bolts and washers maintain this fixed relationship within the cylinder airspace 20 of the electromagnetic engine cylinder housings 1, 2 and 3.

A plurality of electromagnetic ring posts 21 extend radially inwardly from an inner circumference of outer electromagnetic ring 4, forming a ring or stator assembly 91, best seen in FIG. 4 The number of ring posts 21 can be increased or decreased as needed by the user depending on power or efficiency needs. Preferably, ring posts 21 are formed from a magnetic and/or electrically conductive material and are equally spaced in an annular formation along inner circumference of outer electromagnetic ring 4. Each of the electromagnetic ring posts 21 includes electromagnetic ring post neck 22 defined by concave outer edges 54 and outer radial electromagnetic post face 24. Preferably, outer electromagnetic ring post neck 22 includes four concave side edges 54 that are rounded to a predetermined shape. The airspace 20 defined between the outer electromagnetic ring post necks 22 is substantially circular.

Wire coil or winding 23 of a predetermined size is preferably wrapped or coiled about outer electromagnetic post neck 22 of the outer electromagnetic ring post 21, preferably with multiple windings perpendicular to the outer electromagnetic ring post neck 22 and in a predetermined direction. The wire winding 23 from each ring post 21 is connected by suitably sized wiring that passes through the wire chase 32 formed in engine cylinder housings 2 and 3 and further connected to electrical converter 47, best seen in FIG. 9

At least one and preferably a plurality of inner electromagnetic rotors 5 are mounted perpendicular to the crankshaft 7 and are preferably spaced equidistant along the length of shaft or crankshaft 7 between the outside thrust bearings. The electromagnetic rotor 5 is preferably formed from a magnetic and/or electrically conductive material and is preferably circular in shape and extends radially outwardly from crankshaft 7. Crankshaft keys 12, preferably formed from a non-magnetic material in a predetermined elongated shape, are located along the length of shaft 7 and engage with crankshaft opening 51 formed in inner electromagnetic rotor 5. Preferably, each key 12 extends from the center axis of shaft 7 at a predetermined angle with respect to the longitudinal axis of shaft 7, as seen in FIG. 4.

A plurality of electromagnetic posts 25 extend radially outwardly from an outer circumference of electromagnetic rotor 5. The number of posts 25 can be increased or decreased as needed by the user depending on power or efficiency needs. Preferably, posts 25 are formed from a magnetic and/or electrically conductive material and are equally spaced in an annular formation along the outer circumference of rotor 5. Each of electromagnetic rotor posts 25 include electromagnetic rotor post neck 26 defined by concave outer edges 56 and outer radial electromagnetic rotor post face 27. Preferably electromagnetic rotor post neck 26 includes four concave edges 56 that are rounded to a predetermined shape. The cylinder airspace 20 defined between electromagnetic rotor post necks 26 is substantially circular.

Wire coil or winding 23a of a predetermined size is preferably wrapped or coiled with multiple windings perpendicular to the electromagnetic rotor post neck 26 of electromagnetic rotor post 25 in a predetermined direction that is preferably opposite that of the windings 23 of electromagnetic ring posts 21. Each electromagnetic rotor post 25 is wired separately and the wire from windings 23a preferably passes through a plurality of wire chases 31, which is formed in or partially embedded in the rotor wall face 36 of electromagnetic rotor 5 that extends radially inwardly along rotor wall face 36 towards crankshaft 7. Preferably, each wire chase 31 is formed in opposing rotor wall faces 36 of electromagnetic rotor 5 in an alternating pattern of wire chases 31, whereby wire chases 31 from posts 1, 3, 5, 7, and 9 (best seen in FIGS. 7 and 8) are formed in one wall face 36 and wire chases 31 from posts 2, 4, 6, 8, and 10 (best seen in FIGS. 7 and 8) are formed in an opposite wall face 36. These alternating wire chases 31 are partially imbedded or formed for the purpose of providing protection and/or for efficient utilization of space, and for proper positioning of alternating sequencing or patterns related to the electromagnetic rotor posts 25, as will be appreciated by those skilled in the art. Preferably, each wire from windings 23a extends through wire chases 31 to inner contact set 17. Each electromagnetic ring post 21 and each electromagnetic rotor post 25 is wired in a predetermined alternating pattern, such as with electromagnetic rotor 5 with alternating wiring being as an example of 1, 3, 5, 7, 9 etc. (best seen in FIGS. 7 and 8) being in odd pattern or sequence and/or 2, 4, 6, 8, 10, etc being in even pattern or sequence on opposite sides and depending on the need and/or power demand of engine 100, as will be appreciated by those skilled in the art. Shaft 7, inner contact set 17, electromagnetic rotor 5, and electromagnetic rotor posts 25 form a rotor assembly, indicated generally at 92 and best seen in FIG. 6A.

Inner contact set 17 of contact assembly 19 is mounted with n recess 60 formed in each wall face 36 of electromagnetic rotor 5 and preferably includes spacer 61, contact holder 62, and a plurality of contacts 63 arranged in a preferably equally spaced annular formation on an axial face of contact holder 62. Inner contact set 17 is attached to rotor 5 and, therefore, rotates with shaft 7. Contacts 63 can be spring-biased electrical connectors or the like as desired by the user but rest on a side of the canted coil. Outer contact set 18 of contact assembly 19 is preferably mounted in a recess of inside wall face 35 of housings 1 or 3 or mounted to an exterior surface of the housings 2 and includes electrical contact 64 on axial face 65 thereof extending on at least a portion of axial face 65. Outer contact set 18 and electrical contact 64 are preferably formed from an electrically conductive material, chemical or biological, such as, but not limited to, copper, silver, gold, or similar materials therefore, is fixed on electromagnetic rotor 5 with a plurality of screws or other fasteners deemed appropriate and/or necessary by the user and does not rotate with shaft 7. Electrical contact 64 is preferably a canted coil, such as a BalContact™ canted coil spring manufactured by Bal Seal Incorporated, or the like. The outer contact set 18 is electrically connected with inner contact set 17 by the engagement of contacts 63 and the canted coil 64. Canted coil 64 is preferably connected by wiring of a predetermined size to an electrical power, variable or fixed, source or supply 67, best seen in FIG. 9.

Figure 9:
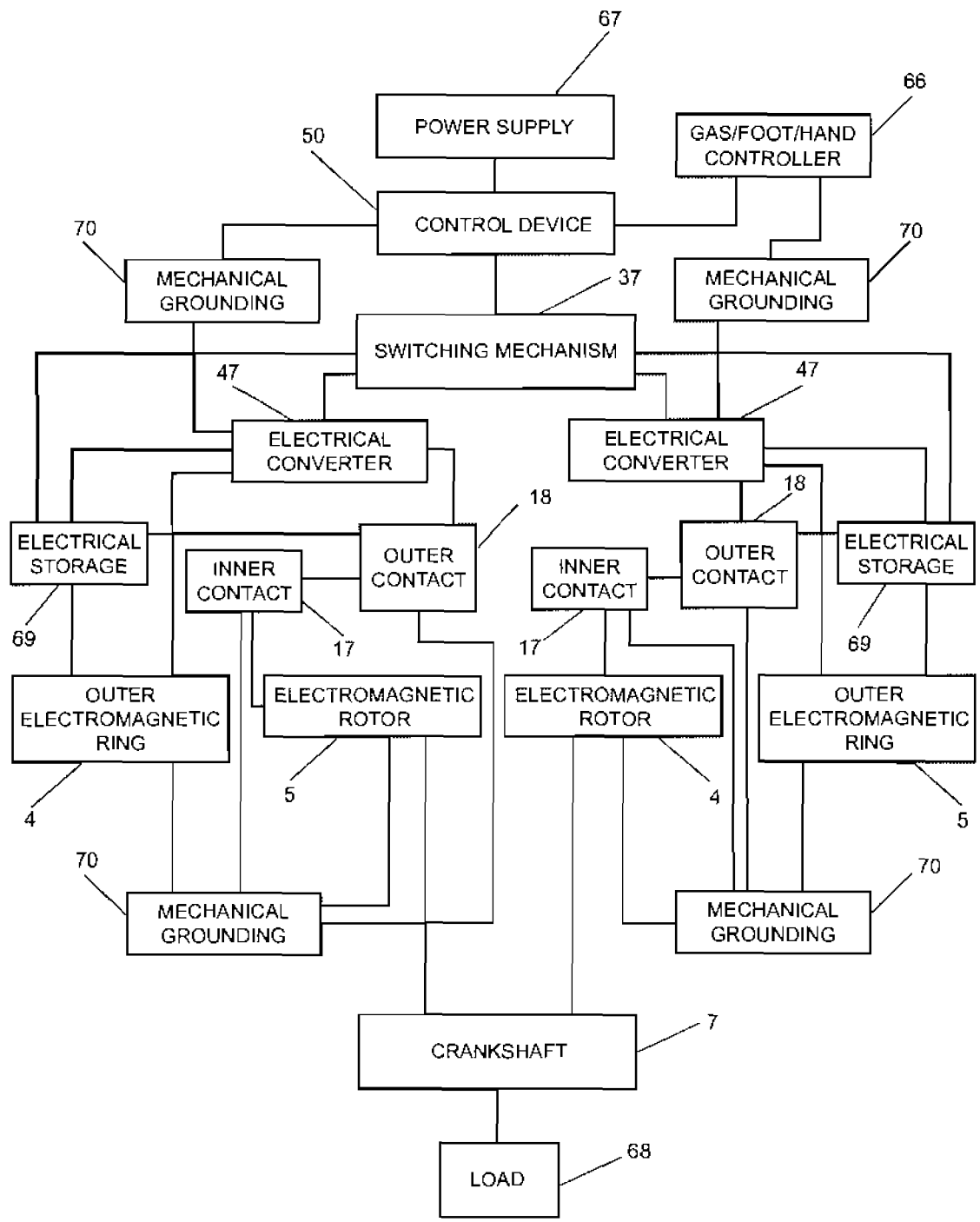
FIG. 9 is a block diagram showing electrical connections of the electromagnetic engine of the present invention.

Referring now to FIG. 9, there is shown the outer contact set 18 of the contact set 19 is electrically connected to an electrical converter 47, such as the NRI Electrical Enhancement System or the like, which uses the inherent electrical properties of magnetics and the inherent magnetic properties of electrons to cause changes in electrical patterns thereby enhancing power output which is further electrically connected to suitable switching mechanism 37. Preferably, switching mechanism 37, such as software and/or hardware that will change the power frequency and/or range of power based on current usage and/or power demands and/or reductions made on the system or the like, is mounted in a suitable location external to the electromagnetic engine housings 1, 2 and 3 of engine 100. Switching mechanism 37 is connected by suitably sized wiring to controller or control device 50 which is preferably receives a user input 66, such as a gas, hand, voice or foot input, so that power from electrical power supply 67 to the electromagnetic ring posts 21 of electromagnetic ring 4 and electromagnetic rotor posts 25 of electromagnetic rotor 5 can be increased or decreased as needed. Electrical power source or supply 67 is any suitable electrical power source such as, but not limited to, a battery, a plurality of batteries, fuel cells, super- or ultracapcitors or other suitable electrical power sources or the like. Controller 50 is connected to rotor posts 21 of electromagnetic ring 4 through switching mechanism 37 and electrical converter 47 in order to energize and de-energize, respectively, coils or windings 23a of rotor posts 21. Controller 50 is preferably, but is not limited to, software and/or hardware that maintains and/or controls the power input, power output, sequencing or patterns, sensing either input or output from sensors, interfacing with other software/hardware that maintains sensors, interface network, temperature of such equipment as mentioned above, positioning of electromagnetic rotor 5 and/or outer electromagnetic ring 4, control of air flow through the said cylinder airspace 20, and proper control of engine efficiency on street, highway or off-road power usage or the like. Controller 50 preferably receives a plurality of Inputs such as from engine 100 including, but not limited to, load on crankshaft 7, rotational position of crankshaft 7, the number and location of energized and de-energized ring posts 21 and rotor posts 25, and the like. Controller 50, in combination with switching mechanism 37, determines the sequence based on the operating conditions and/or an output from controller 50, such as by sending signals and/or commands to switching mechanism 37. Controller 50 maintains and/or controls input and/or output from sensors including but not limited to signals, either digital or analog, from and/or to temperature, positioning, sequential timing and/or power demands of posts of electromagnetic rotor 5 and outer electromagnetic ring 4, user input control device 66, power ratings and current flows both in and out of the engine 100, air flow control devices, heating/cooling devices for user comfort, demagnetization systems, maintenance and/or control of super- or ultracapacitors or the like or any other devices connected to controller 50 and/or part of engine 100. Electrical converter 47 such as the NRI Electrical Enhancement System or the like, which uses the inherent electrical properties of magnetics and the inherent magnetic properties of electrons to cause changes in electrical patterns thereby enhancing power output is preferably electrically connected to electrical storage device 69, such as a super or ultracapacitor or the like such as but not limited to such devices as Maxwell Technologies Ultracapacitors, or Tavrima Supercapacitors, which is further connected to outer electromagnetic ring 4. Mechanical grounding 70 connects to outer electromagnetic ring 4, electromagnetic rotor 5, inner contact 17, outer contact 18, control device 50, and user input 66.

Figure 7:
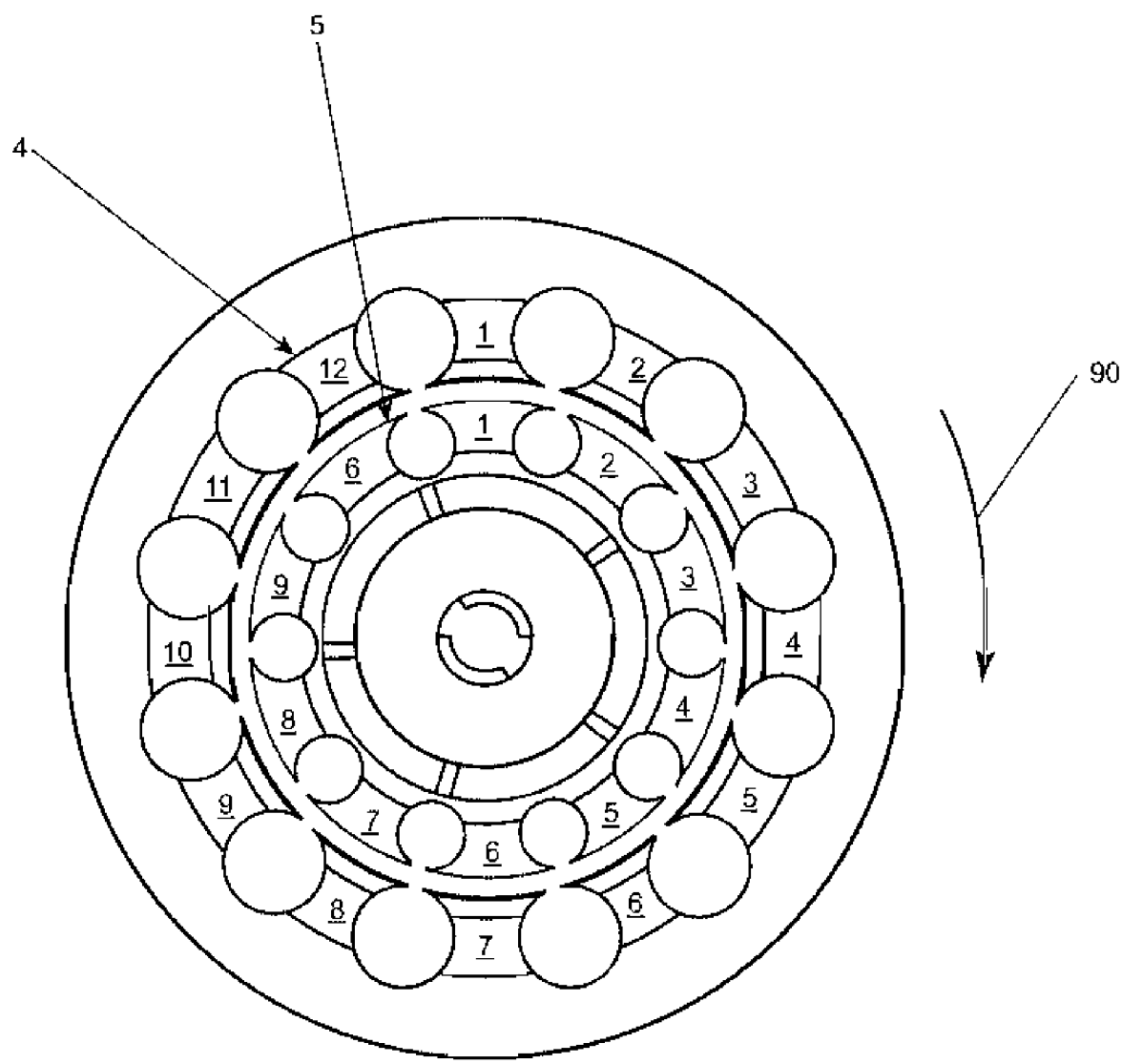
FIGS. 7 and 8 are end views of a partially assembled electromagnetic engine of the present invention showing sequencing.
Figure 8:
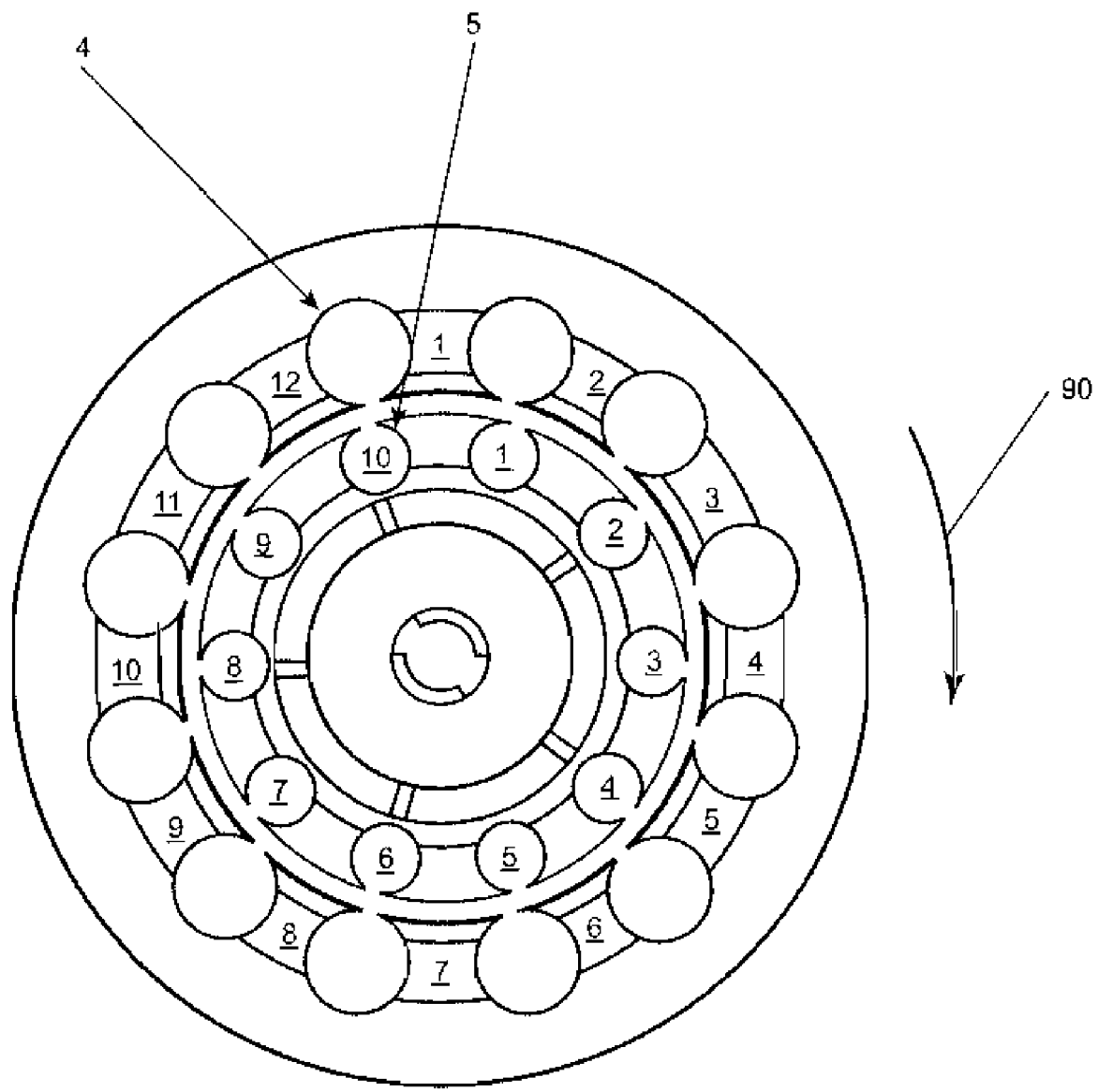

Referring now to FIGS. 7 and 8, non-limiting examples of the electrical sequencings between the outer electromagnetic ring posts 21 of the outer electromagnetic ring 4 and the electromagnetic rotor posts 25 of the electromagnetic rotor 5 are discussed. As an example, windings 23 of outer electromagnetic ring posts 21 of the outer electromagnetic ring 4 are numbered 1, 2, 3, 7, 8 9 and are energized by controller 50 to produce an electromagnet of a predetermined polarity and, preferably substantially simultaneously, windings 23a of electromagnetic rotor posts 25 of the electromagnetic rotor 5 numbered 1, 2, 3, 6, 7, 8 are energized to produce an electromagnet or electromagnetic coil of a polarity opposite that of electromagnetic ring posts 21 by the electrical connection between the canted coils 64 and the buttons 63 of contact set 19 and thereby produce an electromotive force to spin or rotate shaft 7.

By virtue, but not limited to, of the unipolarities of electromagnets of ring posts 21 and rotor posts 25, shaft 7 and, therefore, rotor 5 begin to rotate by magnetic repulsion, for example in a clockwise direction, as indicated by an arrow 90 in FIG. 7. Those skilled in the art will appreciate that rotor 5 may rotate in either a clockwise or counterclockwise direction. As rotation of shaft 7 occurs by repulsion, outer electromagnetic ring posts 21 numbered 1 and 7 are de-energized by controller 50 as faces 27 of rotor posts 25 pass the halfway point of the ring post face 24 and outer electromagnetic ring posts 21 of the outside electromagnetic ring 4 numbered 4 and 10 are energized by controller 50. On the electromagnetic rotor 5, the electromagnetic rotor posts 25 numbered 1 and 6 are de-energized and the electromagnetic rotor posts 24 numbered 4 and 9 are energized to produce an electromagnet as they just pass the halfway point by the respective engagement and disengagement of the electrical connection between the canted coils 64 and the buttons 63 as shaft 7 and rotor assembly 92 rotates. The halfway point (of faces 24 and 27) is determined when the midline of the electromagnetic rotor posts 25 of the electromagnetic rotor 5 pass the midline of the outer electromagnetic ring post 21 of the outer electromagnetic ring 4. The sequence or corkscrew pattern continues in a predetermined direction from the repulsion (i.e. the ring posts 21 and rotor posts 25 next in clockwise position as shown in FIGS. 7-8) between the outer electromagnetic ring posts 21 and the electromagnetic rotor posts 25 until a complete revolution has occurred. The electrical sequences recited above are "examples only" and are by no means the only sequences that can occur within this embodiment of present invention.

In an embodiment of the present invention, there may be six electromagnetic ring posts 21 of the outer electromagnetic ring 21 and six electromagnetic rotor posts 25 of the electromagnetic rotor 5 energized to produce or energize respective opposing electromagnets. Once a full rotation has occurred, the sequence repeats unless a change occurs, such as the controller 50 and/or switching mechanism 37 determining that a change in the sequence is needed based on changed operating conditions. The controller 50 and switching mechanism 37 may also increase or decrease electrical power to the outer electromagnetic ring posts 21 of the outer electromagnetic ring 4 and to the electromagnetic rotor posts 25 of the electromagnetic rotor 5 based on the inputs to controller 50.

In an embodiment of the present invention utilizing a plurality of engines 100 mounted on shaft 7, the corkscrew pattern would have the same sequencing as described above, except that the electromagnetic rotor 5 and the outer electromagnetic ring 4 of the various engines 100 are angled relative to one another at a predetermined rotational distance from the previous and/or subsequent electromagnetic rotor 5 and outer electromagnetic ring 4 based on the position of keys 12, best seen in FIG. 4. Each subsequent electromagnetic rotor 5 and each outer electromagnetic ring 4 is placed at a predetermined distance in rotation from the previous electromagnetic rotor 5 and previous outer electromagnetic ring 4 based on the position of keys 12. As a result of this predetermined rotational distance, the outer electromagnetic ring posts 21 are energized by the controller 60 and switching mechanism 37 in the corkscrew pattern and the electromagnetic rotor posts 25 are energized in the corkscrew pattern based on the electrical connection between the various canted coils 64 and the buttons 63. Based on the various inputs to controller 50, controller 50 and switching mechanism 37 may increase or decrease electrical power to the outer electromagnetic ring posts 21 of the outer electromagnetic ring 4 and to the electromagnetic rotor posts 25 of the electromagnetic rotor 5.

A sequence utilizing full power of engine 100 occurs when all selected outer electromagnetic ring posts 21 and all selected electromagnetic rotor posts 25 such as at start up, passing or change in transition or terrain or the like, if engine 100, for example, is utilized as propulsion for an automotive vehicle or the like. A lower powered sequence utilizing fewer selected outer electromagnetic ring posts 21 and electromagnetic rotor posts 25 occurs for highway or decreased demand interval (lower speeds but continuous motion) or the like. The corkscrew pattern utilizing selected outer electromagnetic ring posts 21 and electromagnetic rotor posts 25 occurs in alternating sequences in embodiments of the present invention that comprise multiple outer electromagnetic rings 4 and electromagnetic rotors 5 each mounted on shaft 7 with a corresponding number of intermediate housings 2, such as for heavy power needs, lifting, to create lift or the like. Alternatively, controller 50 and switching mechanism 37 may energize and de-energize ring posts 21 to produce an electromagnet of varying polarity such that rotation occurs by magnetic attraction and/or magnetic repulsion. Those skilled in the art will appreciate that other sequences may be utilized while remaining within the scope of the present invention.

Figure 10:
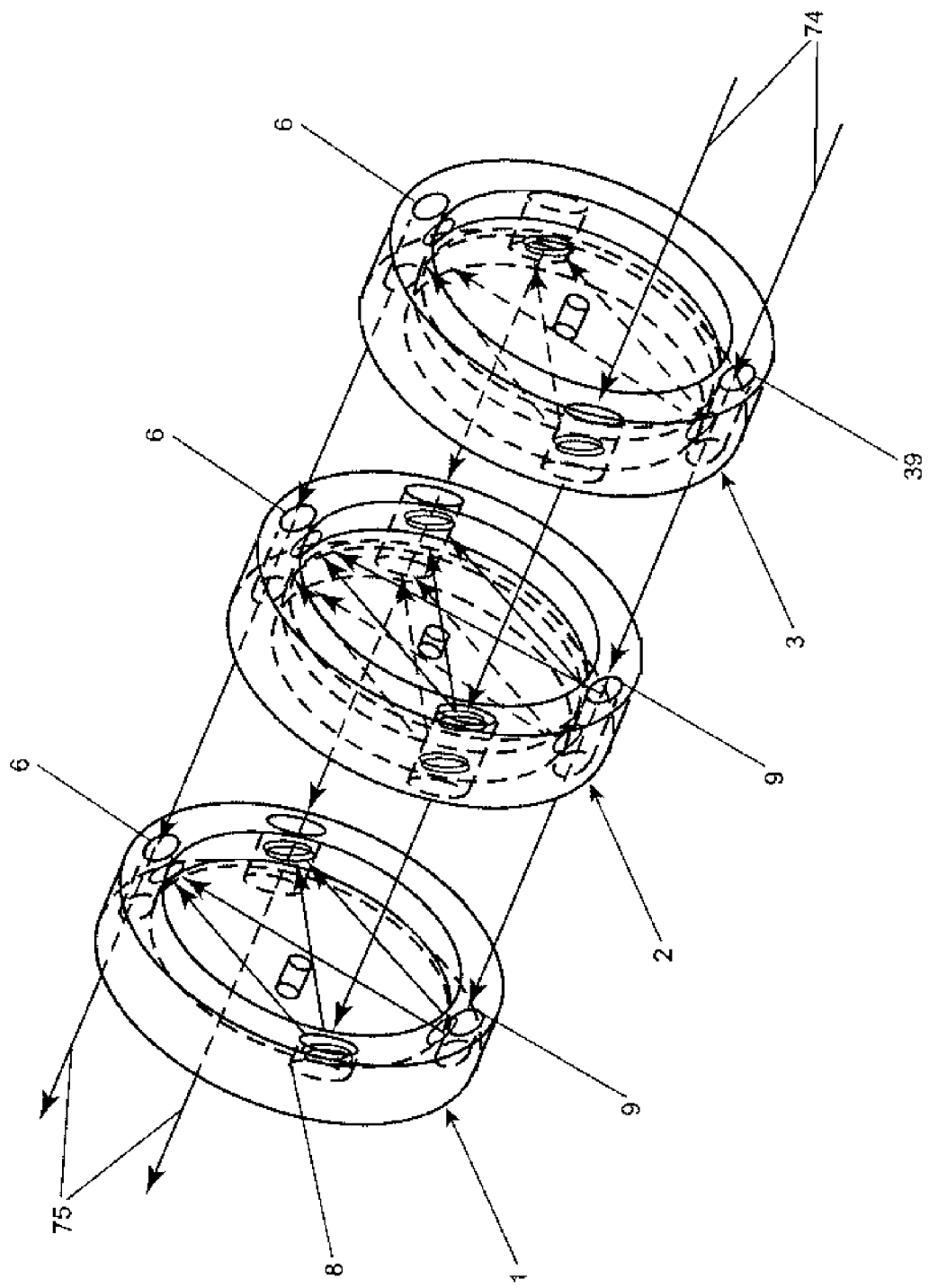
FIG. 10 is a schematic perspective view of air flow through the electromagnetic engine of the present invention.

As the electromagnetic engine 100 operates and rotation occurs in a predetermined direction such as 90 shown in FIG. 7, air, either free flow or induced, as shown in FIG. 10 preferably flows in a direction indicated by an arrow 74 through the upper intake inlet 38 and the lower intake inlet 39 and to the upper intake air passage 8 and the lower intake air passage 9. The air then flows through the upper cylinder intake 40 and the lower cylinder intake 41 flowing into the cylinder airspace 20. Air flows through cylinder airspace 20, flowing through and around and thereby cooling outer electromagnetic ring 4, electromagnetic rotor 5, contact set 19 and crankshaft 7. The air then flows through upper cylinder exhaust port 42 and lower cylinder exhaust port 43 into upper exhaust air passage 10 and lower exhaust air passage 11 through the upper exhaust outlet 44 and lower exhaust outlet 45 in a direction indicated by an arrow 75 to atmosphere or an exhaust mechanism (not shown). The passage of air through the respective passages 8, 9, 20, 38, 39, 40, 41, 42, 43, 44 and 45 of the electromagnetic engine 100 helps the electromagnetic engine 100 function more efficiently and maintains a desired temperature range within airspace 20 which helps to boost power through and from engine 100.

Figure 11:
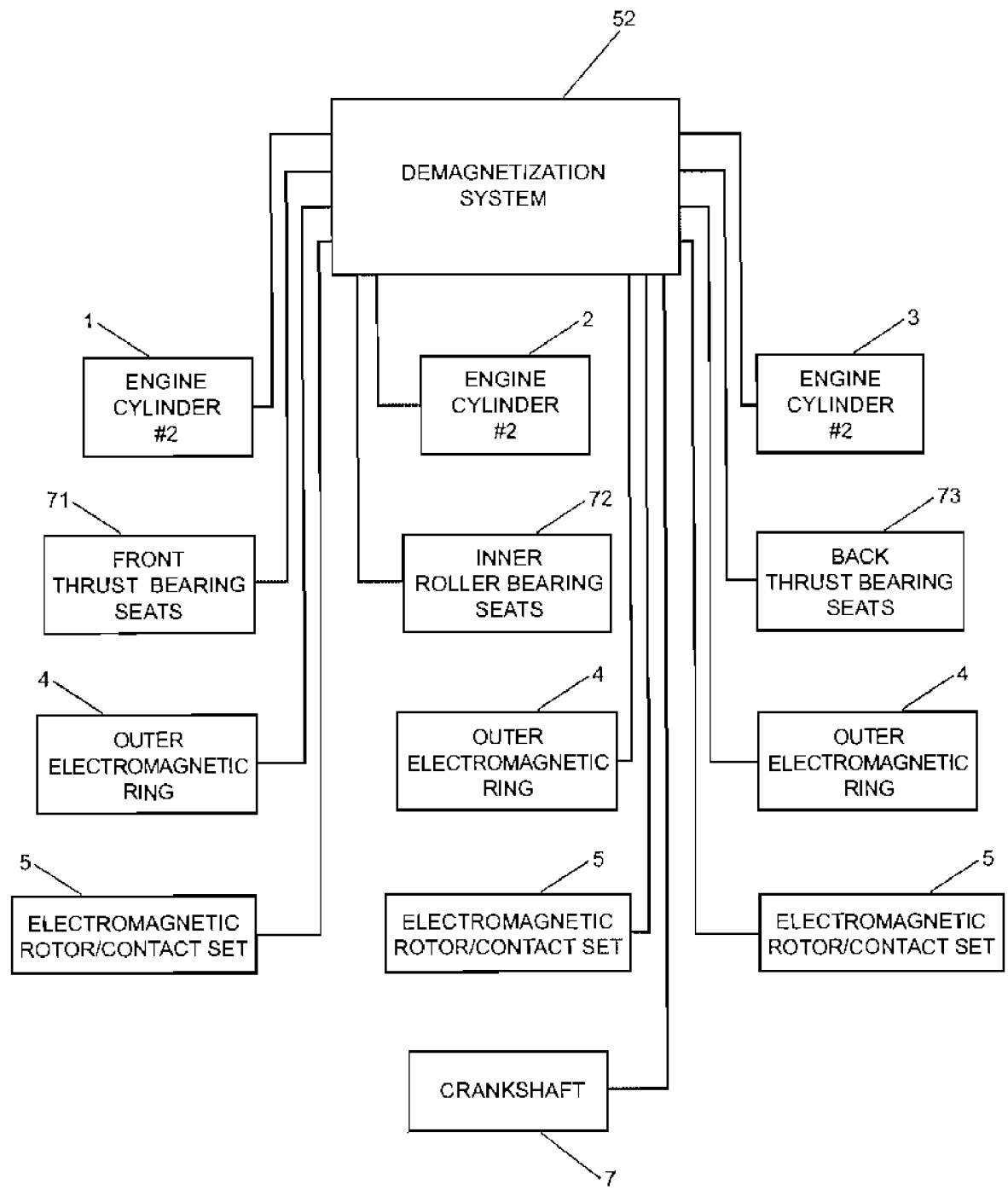
FIG. 11 is a block diagram of a demagnetization system of the present invention.

In FIG. 11 there is shown demagnetization system 52 for the prevention of electromagnetic energy buildup on components within proximity to where magnetic energy may be present. If provided, demagnetization system 52 functions when power is shut off to the outer electromagnetic ring 4 and electromagnetic rotor 5 and when the presence of magnetic energy is detected by a system 52, such as by a signal from controller 50. The demagnetization contacts 53 are placed in predetermined locations along the electromagnetic engine housings 1, 2, 3 which will then allow the demagnetization system 52 to demagnetize the electromagnetic engine cylinder housings 1, 2, 3 from magnetic energy that may be present and may reuse it if desired in the system. Demagnetization contacts (not shown) are placed in predetermined locations around the inner roller bearing seats 72, outer thrust bearing seats 71 and 73 to demagnetize the inner roller bearings 13 and the outer thrust bearings from magnetic energy that may be present. Demagnetization contacts are placed around electromagnetic rings 4 and around the electromagnetic rotor 5 in predetermined locations will demagnetize any magnetic energy that may be present in electromagnetic rings 4 and around the electromagnetic rotors 5.

Although the invention has been described in detail with particular reference to these preferred embodiments, other embodiments can achieve the same results. Variations and modifications of the present invention will be obvious to those skilled in the art and it is intended to cover in the appended claims all such modifications and equivalents. The entire disclosures of all references, applications, patents, and publications cited above are hereby incorporated by reference.

What is claimed is:

1. A contact system for energizing an electromagnetic engine, comprising:
    a fixed first contact connector having an axial face and at least a first electrical connector disposed on at least a portion of said axial face, a concave face, or any other shape as desired by the user, said first contact connector is connected to a variable or fixed electrical power source; and
    a rotatable second contact connector having an axial face, adjacent convex, or any other shape as desired by the user, and a plurality of second electrical connectors; said axial face of said first contact connector and a predetermined number of said second electrical connectors that are equally spaced apart extending along said axial face of second contact connector; when pressure is placed against said first electrical connector of said first contact connector against said second electrical connectors, a predetermined number of second electrical connectors are thereby energized by the first electrical connector; each of said second electrical connectors thereby energize a predetermined number of electromagnetic coils when said second electrical connectors engage with said first electrical connector during rotation of said second contact connector.

2. The system of claim 1 wherein said first electrical connector comprises a canted coil that is set to a predetermined composition, size, tolerance, angle or tension for electrical power transfer as determined by the user.

3. The system of claim 1 wherein said second electrical connectors comprising a plurality of predetermined contacts that are placed on a side of the canted coil set to a predetermined composition, size tolerance, angle or tension.

4. The system of claim 1 wherein said first contact connector is adapted to be mounted within the cylinder airspace within an electromagnetic engine housing.

5. The system of claim 1 wherein said second contact connector is adapted to be mounted on a rotor that resides within the cylinder airspace and surrounds a rotatable shaft.

6. The system of claim 1 wherein said second electrical connectors are each connected to a predetermined number of electromagnetic coils to induce a rotation of said shaft by a method of repulsion or repulsion/attraction thereby causing a predetermined amount of force to be created by the forces of magnetic energy that causes the shaft to move in a predetermined direction.

7. The system of claim 1 wherein said first electrical connector extends along a predetermined annular distance of said axial face of said first contact connector.

8. The system of claim 7 wherein said predetermined annular distance is sized to allow a predetermined number of said second electrical connectors to engage with said first electrical connector.

9. The system of claim 1 wherein said second electrical connectors are equally annularly spaced apart on said axial face of said second contact connector.

10. An electromagnetic engine, comprising:
    at least one housing defining an airspace therein;
    a first contact set disposed within and attached to said at least one housing and connected to an electrical power source;
    a controller connected to said electrical power source;
    a stator ring assembly disposed within and attached to said at least one housing and connected to said controller, said controller operable to intermittently energize at least a portion of said stator ring assembly; and
    a rotor assembly disposed within and rotatably engaged with said at least one housing, said rotor assembly including a shaft and a second contact set and disposed radially inwardly from said stator ring assembly, said second contact set including a plurality of electrical connectors, said electrical connectors intermittently engaging with said first contact set to energize said rotor assembly, said rotor assembly and said stator ring assembly producing an electromotive force to spin said shaft during operation of said electromagnetic engine.

11. The engine of claim 10 wherein said rotor assembly and said stator ring assembly produce said electromotive force by repulsion.

12. The engine of claim 11 wherein said rotor assembly and said stator ring assembly produce said electromotive force by attraction and repulsion.

13. The engine of claim 10 further comprising a plurality of housings and electromagnetic engines mounted together with said shaft extending from one end of engine housing to another engine housing as desired by the user.

14. The engine of claim 10 wherein said first contact set comprises at least one canted coil disposed on an axial face of a housing.

15. The engine of claim 14 wherein said canted coil extends for a predetermined annular distance along said first contact set housing.

16. The engine of claim 14 wherein said second contact connector further comprises a plurality of annularly spaced contacts that rest on a side of the canted coil.

17. The engine of claim 16 wherein said annularly spaced contacts are equally annularly spaced apart on said second contact set.

18. The engine of claim 10 wherein said stator ring assembly comprises a plurality of radially inwardly extending posts having electric wire wound thereon and forming stator windings, said stator windings connected to said power source, and said rotor assembly comprises a plurality of radially outwardly extending posts having electric wire wound thereon and forming rotor windings, said rotor windings connected to said second contact set.

19. The engine of claim 18 wherein said stator windings create an electromagnet of a predetermined polarity when energized and wherein said electrical connectors are connected to a predetermined number of rotor windings and create an electromagnet of a predetermined polarity opposite the polarity of said stator windings when energized.

20. The engine of claim 10 further comprising a switching mechanism connected to said controller.

21. The engine of claim 10 wherein said controller is selected from the group consisting of software, hardware, and combinations thereof.

22. The engine of claim 10 wherein said stator ring assembly is attached to said housing by a plurality of bushings and fasteners.

23. The engine of claim 22 wherein said bushings comprise a nonmagnetic material.

24. The engine of claim 10 further comprising a plurality of cooling holes formed in said housing to allow air flow through said airspace of said housing.

25. The engine of claim 10 further comprising a demagnetization system for demagnetizing magnetic energy present in at least said housing, said stator assembly, said rotor assembly, and said shaft and reabsorbing magnetic energy, as desired by the user, for use as energy by said electromagnetic engine.

26. The engine of claim 10 further comprising a plurality of stator ring assemblies and rotor assemblies spaced along a length of said shaft, each of said stator ring assemblies and rotor assemblies disposed in at least another housing.

* * * * *